(12) United States Patent
Chen et al.

(10) Patent No.: US 7,272,145 B2
(45) Date of Patent: Sep. 18, 2007

(54) RESOURCE RESERVATION PROTOCOL BASED GUARANTEED QUALITY OF SERVICE INTERNET PROTOCOL CONNECTIONS OVER A SWITCHED NETWORK THROUGH PROXY SIGNALING

(75) Inventors: Weijing Chen, Austin, TX (US); Paul F. Van Vleck, Austin, TX (US); Keith Joseph Allen, Austin, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 1003 days.

(21) Appl. No.: 10/207,906

(22) Filed: Jul. 31, 2002

(65) Prior Publication Data

US 2004/0022247 A1 Feb. 5, 2004

(51) Int. Cl.
- *H04L 12/28* (2006.01)
- *H04L 12/56* (2006.01)
- *H04L 12/66* (2006.01)
- *G06F 15/16* (2006.01)

(52) U.S. Cl. .............. 370/395.5; 370/395.52; 370/401; 370/410; 709/203; 709/249

(58) Field of Classification Search ........ 370/395.5, 370/395.52, 401, 410; 709/203, 249
See application file for complete search history.

(56) References Cited

U.S. PATENT DOCUMENTS

| | | |
|---|---|---|
| 5,600,644 A | 2/1997 | Chang et al. |
| 5,610,910 A | 3/1997 | Focsaneanu et al. |
| 5,633,869 A | 5/1997 | Burnett et al. |
| 5,732,078 A | 3/1998 | Arango |
| 5,737,333 A | 4/1998 | Civanlar et al. |
| 5,757,796 A | 5/1998 | Hebb et al. |
| 5,781,529 A | 7/1998 | Liang et al. |
| 5,809,025 A | 9/1998 | Timbs |

(Continued)

FOREIGN PATENT DOCUMENTS

| | | |
|---|---|---|
| WO | 99/29137 | 6/1999 |
| WO | 00/57296 | 9/2000 |
| WO | 00/76122 | 12/2000 |
| WO | 01/11837 | 2/2001 |
| WO | 01/31829 | 5/2001 |

OTHER PUBLICATIONS

Abstract of EP 1036450, published on Sep. 20, 2000.

(Continued)

*Primary Examiner*—Alpus H. Hsu
(74) *Attorney, Agent, or Firm*—Greenblum & Bernstein, P.L.C.

(57) ABSTRACT

A system and method establish an Internet protocol (IP) connection between an originating end-system and a destination end-system, incapable of resource reservation protocol (RSVP) signaling, through a switched transport network. A first interworking function (IWF) device inserts its switched transport network address into a first data field of an RSVP path message, received from an RSVP capable proxy signaling device that interfaces with the destination end-system. The first IWF device forwards the path message, through routers in an IP network, which is passed without modification to the first data field. A second IWF device receives the path message and forwards a setup message to the first IWF device through switching devices in the switched transport network, based on the first IWF device's address retrieved from the first data field of the path message. The IP connection is established through the proxy signaling device in response to the setup message.

31 Claims, 6 Drawing Sheets

U.S. PATENT DOCUMENTS

| | | | |
|---|---|---|---|
| 5,828,844 | A | 10/1998 | Civanlar et al. |
| 5,835,710 | A | 11/1998 | Nagami et al. |
| 5,892,763 | A | 4/1999 | Laraqui et al. |
| 5,903,559 | A | 5/1999 | Acharya et al. |
| 5,930,477 | A | 7/1999 | Uchida |
| 5,936,959 | A | 8/1999 | Joffe |
| 5,940,394 | A | 8/1999 | Killian |
| 5,940,396 | A | 8/1999 | Rochberger |
| 5,946,313 | A | 8/1999 | Allan et al. |
| 5,949,782 | A | 9/1999 | Wells |
| 5,958,018 | A | 9/1999 | Eng et al. |
| 5,983,332 | A | 11/1999 | Watkins |
| 5,991,854 | A | 11/1999 | Watkins |
| 6,016,319 | A | 1/2000 | Kshirsagar et al. |
| 6,021,263 | A | 2/2000 | Kujoory et al. |
| 6,034,958 | A | 3/2000 | Wicklund |
| 6,078,586 | A | 6/2000 | Dugan et al. |
| 6,081,836 | A | 6/2000 | Karapetkov et al. |
| 6,111,881 | A | 8/2000 | Soncodi |
| 6,122,670 | A | 9/2000 | Bennett et al. |
| 6,138,144 | A | 10/2000 | DeSimone et al. |
| 6,163,807 | A | 12/2000 | Hodgkinson et al. |
| 6,195,364 | B1 | 2/2001 | Brodigan |
| 6,222,842 | B1 | 4/2001 | Sasyan et al. |
| 6,240,462 | B1 | 5/2001 | Agraharam et al. |
| 6,252,857 | B1 | 6/2001 | Fendick et al. |
| 6,314,098 | B1 | 11/2001 | Masuda et al. |
| 6,336,129 | B1 | 1/2002 | Ise et al. |
| 6,343,322 | B2 | 1/2002 | Nagami et al. |
| 6,343,326 | B2 | 1/2002 | Acharya et al. |
| 6,345,051 | B1 | 2/2002 | Gupta et al. |
| 6,385,170 | B1 | 5/2002 | Chiu et al. |
| 6,456,962 | B1 | 9/2002 | Allingham et al. |
| 6,470,389 | B1 | 10/2002 | Chung et al. |
| 6,487,595 | B1 | 11/2002 | Turunen et al. |
| 6,496,479 | B1 | 12/2002 | Shionozaki |
| 6,516,417 | B1 | 2/2003 | Pegrum et al. |
| 6,523,068 | B1 | 2/2003 | Beser et al. |
| 6,538,416 | B1 | 3/2003 | Hahne et al. |
| 6,563,793 | B1 | 5/2003 | Golden et al. |
| 6,563,794 | B1 | 5/2003 | Takashima et al. |
| 6,598,080 | B1 | 7/2003 | Nagami et al. |
| 6,625,124 | B1 | 9/2003 | Fan et al. |
| 6,625,156 | B2 | 9/2003 | Shaio et al. |
| 6,721,272 | B1 * | 4/2004 | Parnafes et al. ............ 370/235 |
| 6,751,218 | B1 | 6/2004 | Hagirahim et al. |
| 6,788,647 | B1 * | 9/2004 | Mohaban et al. ........... 370/235 |
| 6,798,782 | B1 | 9/2004 | Caronni et al. |
| 6,819,678 | B2 | 11/2004 | Sylvain |
| 6,839,766 | B1 * | 1/2005 | Parnafes et al. ............ 709/232 |
| 6,918,752 | B2 | 7/2005 | Seno et al. |
| 7,054,295 | B1 * | 5/2006 | Nitta .......................... 370/338 |
| 7,058,014 | B2 | 6/2006 | Sim |
| 7,085,279 | B1 | 8/2006 | Kumar et al. |
| 7,151,770 | B1 | 12/2006 | Clark |
| 2002/0038419 | A1 | 3/2002 | Garrett et al. |
| 2002/0061011 | A1 | 5/2002 | Wan |
| 2002/0089985 | A1 | 7/2002 | Wahl et al. |
| 2002/0141369 | A1 | 10/2002 | Perras |
| 2002/0150083 | A1 * | 10/2002 | Fangman et al. ........... 370/352 |
| 2002/0196793 | A1 | 12/2002 | Samba et al. |
| 2003/0028671 | A1 | 2/2003 | Mehta et al. |
| 2003/0067903 | A1 | 4/2003 | Jorgensen |
| 2003/0076854 | A1 | 4/2003 | Mudhar et al. |
| 2003/0088696 | A1 | 5/2003 | McCanne |
| 2005/0195855 | A1 | 9/2005 | Biskirk et al. |

OTHER PUBLICATIONS

"The Internet Multimedia Conferencing Architecture", by Handley et al., INET '96, Jun. 1996, pp. 1-13, <http://www.isoc.org/inet96/proceedings/.>.

"RSVP-ATM QoS Interworking", Cisco IOS Release 12.0 (3), 2001, pp. 1-34.

"RSVP Over ATM Implementation Requirements", by Berger, FORE Systems, Aug. 1998, <ftp://ftp.isi.edu/in-notes/rfc2380.txt>.

"An Overview of ATM", <http://www.rware.demon.co.uk/atm.htm>, 1999.

"QoS Trials on SuperJANET in the Context of HICID and Other BT/JISC Project", by Crowcroft et al., Nov. 14, 1997, <http://www.cs.ucl.ac.uk/research/hicid/jisc-anc.html>.

"Extensions to RSVP for QoS IP Over Signaled QoS Network", by Chen et al., SBC Communications, Inc., Apr. 2002, <http://www.ietf.org/internt-drafts/draft-weijing-rsvp-sqn-00.txt>.

"Resource Reservation Protocol", Cisco Systems, Inc., published on Feb. 20, 2002, <http://www.cisco.com/univercd/cc/td/doc/cisintwk/ito_doc/rsvp.htm>.

Wan, "ASP Bi-level Addressing & ANS Requirements" (99-0534), dated Sep. 26-Oct. 1, 1999, pp. 1-8.

Wan, "ASP Bi-level Addressing Architecture" (99-0649), dated Nov. 28-Dec. 4, 1999, pp. 1-6.

ATM Forum Addressing: Reference Guide (AF-RA-0106.000), The ATM Forum Technical Committee, dated Feb. 1999. pp. 1-42.

"ATM Forum Addressing: User Guide version 1.0" (AF-RA-0105.000), The ATM Forum Technical Committee, dated Jan. 1999, pp. 2-27.

"PNNI Transported Address Stack version 1.0" (AF-CS-0115.000), The ATM Forum Technical Committee, dated May 1999, pp. 1-24.

"New Capabilities ATM Addressing Document (Draft)" (BTD-RA-ADDR-02.03), The ATM Forum Technical Committee, dated Oct. 1998, pp. 1-13.

"ATM Name System V2.0 Baseline Text" (BTD-SAA-ANS-02.01), The ATM Forum Technical Committee, dated Jul. 1999, pp. 2-15.

"ATM Bi-Level Addressing Document, Version 1.0" (STR-RA-ADDR-01.00), The ATM Forum Technical Committee, dated Jul. 2000, pp. 1-11.

"ATM Bi-Level Addressing Document, Version 1.0 (Draft)" (STR-RA-ADDR-01.00), The ATM Forum Technical Committee, dated Jul. 2000, pp. 1-12.

Specification for RFC 1034, entitled: "Domain Names-Concepts and Facilities", Nov. 1987, pp. 1-103.

Specification for RFC 1035, entitled: "Domain Names-Implementation and Specification", Nov. 1987, pp. 1-54.

Specification for RFC 1995, entitled: "Incremental Zone Transfer in DNS" Aug. 1996.

Specification for RFC 1996, entitled "A Mechanism for Prompt Notification of Zone Changes (DNS NOTIFY)," Aug. 1996, pp. 1-7.

Specification for RFC 2065, entitled: "Domain Name System Security Extensions" Jan. 1997, pp. 1-41.

Specification for RFC 2136, entitled: "Dynamic Updates in the Domain Name System (DNS UPDATE)," Apr. 1997, pp. 1-26.

Specification for RFC 2137, entitled: "Secure Domain Name System Dynamic Update", Apr. 1997, pp. 1-11.

K. Allen et al., "Ipv6 for Large Access Providers" (Oct. 2002).

Karsten et al., "An Embedded Charging Approach for RSVP," Quality of Service, 1998 (IWQoS 98), 1998 Sixth International Workshop, May 18-20, 1998, pp. 91-100.

Karsten et al., "An Embedded Charging Approach for RSVP," Quality of Service, 1998 (IWQoS 98), 1998 Sixth International Workshop, May 18-20, 1998, pp. 91-100.

Viswanathan et al., "Soft State Switching: A Proposal to Extend RSVP for Switching RSVP Flows," IETF, Internet-Draft (draft-viswanathan-aris-rsvp-00.txt), Mar. 1997.

Wroclawski, "The Use of RSVP with IETF Integrated Services," IETF, RFC 2210, Sep. 1997.

\* cited by examiner

RESOURCE RESERVATION PROTOCOL BASED GUARANTEED QUALITY OF SERVICE INTERNET PROTOCOL CONNECTIONS OVER A SWITCHED NETWORK THROUGH PROXY SIGNALING

CROSS-REFERENCE TO RELATED APPLICATIONS

This application incorporates by reference in their entireties the disclosures of the following applications, filed concurrently: "Resource Reservation Protocol Based Guaranteed Quality of Service Internet Protocol Connections over a Switched Network," patent application Ser. No. 10/207,886; Resource Reservation Protocol Based Guaranteed Quality of Service Internet Protocol (IP) Connections Over a Switched Network using Newly Assigned IP Addresses," patent application Ser. No. 10/207,880, now issued U.S. Pat. No. 7,065,092; and "Enhancement of Resource Reservation Protocol Enabling Short-Cut Internet Protocol Connections over a Switched Network," patent application Ser. No. 10/207,905.

BACKGROUND OF THE INVENTION

1. Field of the Invention

The present invention relates to the field of telecommunications. More particularly, the present invention relates to establishing broadband Internet protocol (IP) connections over a switched network, capable of guaranteeing desired connection parameters, based on resource reservation protocol (RSVP) signaling.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:
Address Resolution Protocol (ARP)
Asynchronous Transfer Mode (ATM)
Constraint-Based Routed Label Distribution Protocol (CR-LDP)
Digital Subscriber Line (DSL)
Domain Naming System (DNS)
Dynamic Host Configuration Protocol (DHCP)
Generalized Multi-Protocol Label Switching (GMPLS)
Internet Protocol (IP)
Internet Service Provider (ISP)
Interworking Function (IWF)
Last-In-First-Out (LIFO)
Local Area Network (LAN)
Local IP Subnet (LIS)
Multiple Address Resolution Server (MARS)
Multi-Protocol Label Switching (MPLS)
Network Service Access Point (NSAP)
Next Hop Resolution Protocol (NHRP)
Next Hop Server (NHS)
Non-Broadcasting Multiple Access (NBMA)
Permanent Virtual Circuit (PVC)
Private Network-to-Network Interface (PNNI)
Resource Reservation Protocol (RSVP)
Quality of Service (QoS)
Request for Comment (RFC)
Switched Virtual Circuit (SVC)
Time Division Multiplex (TDM)
Transmission Control Protocol (TCP)
Universal Resource Locator (URL)
User Datagram Protocol (UDP)
User Network Interface (UNI)
User-to-User Information Element (UU IE)
Virtual Channel Identifier (VCI)
Virtual Path Identifier (VPI)
Virtual Private Network (VPN)
Wide Area Network (WAN)

BACKGROUND AND MATERIAL INFORMATION

With the development of various communications applications for use over packet switched data networks, such as the Internet, demands for predictable bandwidth and delay support are increasing. For example, services including voice-over-Internet and real-time audio, audio-visual and white-board conferencing, require the packets of transmitted data to arrive at a destination terminal with minimal delay and in a presentable order.

Packet switched data networks generally support "best effort" routing of data. The packets of information sent from an originating end-system, such as an Internet subscriber, to a destination end-system, such as an Internet service provider (ISP), are transmitted through a network of interconnected routers using Internet protocol (IP). The IP network essentially divides the transmitted data into packets, each of which travels to the destination end-system through a uniquely determined path among the available routers. The flow of a packet from one router to the next router in the IP network is called a "hop." The destination end-system ultimately receives the packets and assembles them in the appropriate order to present the transmitted information.

Best effort routing is very flexible in that the data packets travel through any available combination of routers to ultimately reach the destination end-system. When a router becomes unavailable, for example, due to traffic congestion causing its queue threshold to be exceeded, the data packets simply proceed through a different path. A disadvantage of best effort routing is that the speed and quality of the IP traffic is inconsistent due to packets being delayed, lost and received out of order. In typical data transfer scenarios, this disadvantage may be insignificant, especially when additional protocols, such as transmission control protocol/Internet protocol (TCP/IP) and user datagram protocol/Internet protocol (UDP/IP), are implemented to resend and otherwise minimize the effect of lost and delayed data packets. However, many evolving applications depend on consistent and reliable data packet routing, such as those applications involving real-time streaming of audio and/or visual data.

The network criteria, such as bandwidth, needed for the IP network to support these applications are set forth in the quality of service (QoS) parameters. Generally, best effort routing cannot guarantee a particular QoS, especially when a large bandwidth is needed. Differential services may be available in some IP networks. Differential services push aside lower priority traffic to accommodate a predetermined QoS for transmissions of select subscribers, based on a preferred differential level indicator in the data packet headers. However, differential services do not guarantee the desired level of service.

An IP network may also be implemented in conjunction with a non-broadcasting multiple access (NBMA) switched network, such as an asynchronous transfer mode (ATM) network, which is able to set aside communication paths that meet the predefined traffic requirements of the specific applications. For example, an ATM network may set up and tear down a switched virtual circuit (SVC) of a specified bandwidth in response to dynamic communication demands on a per connection basis. The IP network interfaces with a switched network according to various mutually recognized protocols, such as resource reservation protocol (RSVP) and next hop resolution protocol (NHRP). Because the switched network is typically able to isolate or reserve a particular route for the duration of a connection, the required QoS may be established upon connection to the network, accommodating predetermined parameters such as delay, delay jitter and error rate, as well as the demands of the application and the state of the network at the time of connection.

RSVP is a network control protocol that enables QoS connections to be established and maintained by dynamically allocating bandwidth. RSVP is receiver initiated in that the destination end-system initiates the actual reservation of resources or routing elements that enable the connection. When the IP network is implemented over an ATM network, the IP addresses of the routing elements are translated into ATM addresses by a central server or database. The flow may then pass through the switched network by setting up virtual circuits among ATM switches.

NHRP is an address resolution protocol that enables an IP end-system to interface with a switching network, such as an ATM network, and connect with another IP end-system. Use of NHRP extends address resolution between networks across IP subnets. An originating end-system requests a connection through routers in an IP network to a desired destination end-system. A next hop server (NHS) maps the IP address of the destination end-system to its associated ATM address using mapping data and directs the routers to the next hop router in the IP network, until the connection request reaches the destination end-system. Generally, NHRP is not capable of supporting multicast communications.

Although conventional RSVP and NHRP generally enable IP connections over switched networks, they are relatively cumbersome to implement. Both protocols require accessing a central mapping server or database, such as an address resolution protocol (ARP) server or an NBMA-IP server, to associate IP addresses with the corresponding NBMA switched network addresses, and to otherwise control the routing. Each device must register its IP address and NBMA address in the server, which resolves the IP addresses to the registered ATM addresses in response to connection requests. Furthermore, RSVP and NHRP do not accommodate simultaneous, point-to-multipoint (i.e., multicast) transmissions. Also, RSVP has limited scalability due to extension state information and constant refreshment, and many conventional end-systems are not RSVP capable.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
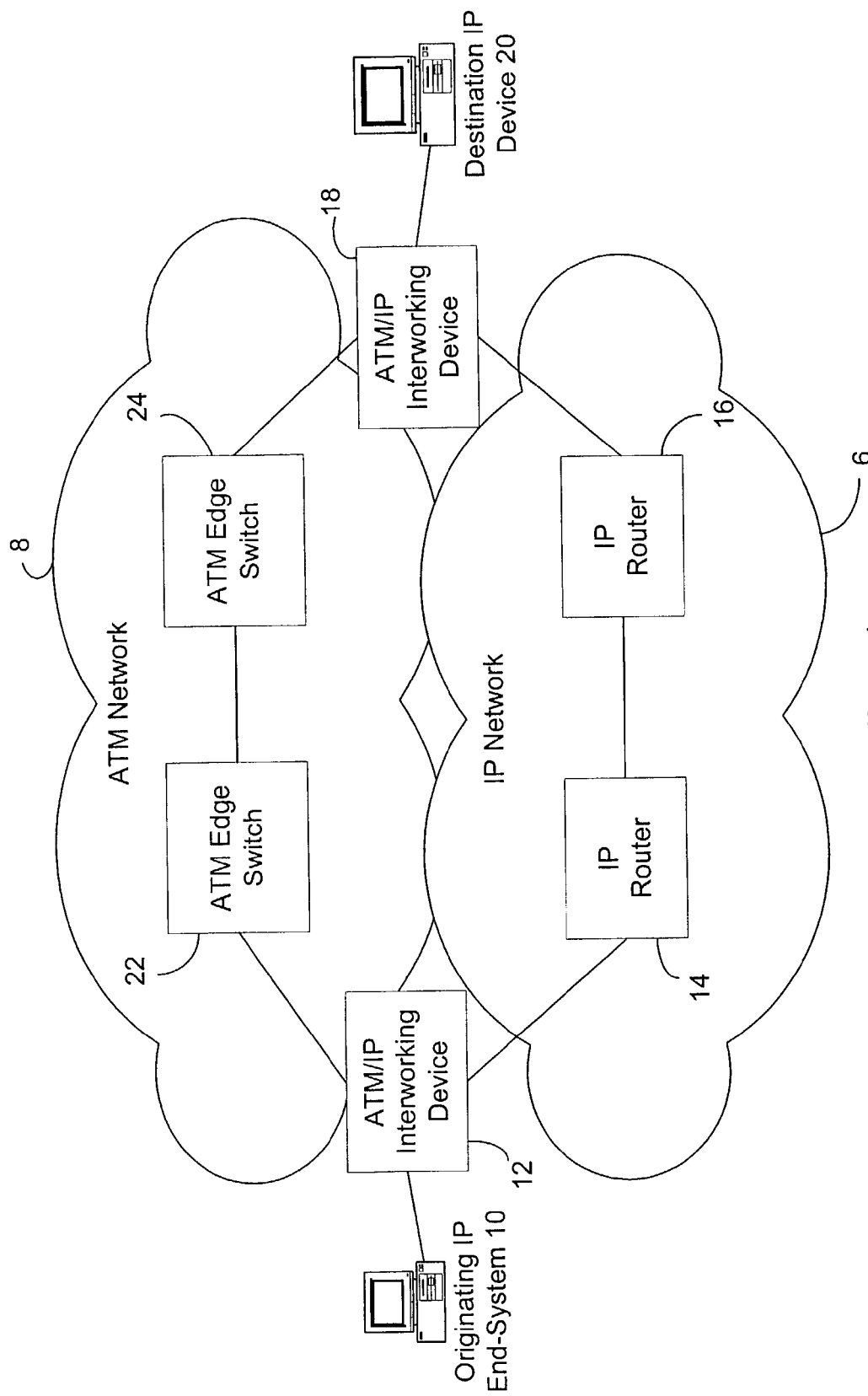
FIG. 1 is a diagram showing an exemplary network infrastructure, according to an aspect of the present invention.

The present invention relates to enhancing RSVP to efficiently establish dynamic short-cut IP connections through an associated switched network. The enhancements include adding an extension object to the RSVP messaging that identifies a switched network address of an originating interworking function device located in the IP network and the switched network, without accessing a mapping database, server or the like. The system is very scalable with a large number of subscribers and incurs minimum administrative and operational overhead.

In view of the above, the present invention through one or more of its various aspects and/or embodiments is presented to accomplish one or more objectives and advantages, such as those noted below.

An aspect of the present invention provides a method for establishing an Internet protocol (IP) connection through a switched transport network, between an originating host device and a destination host device communicating through an IP network, where the destination host device is incapable of resource reservation protocol (RSVP) signaling. A switched transport network address of a destination bridging device is associated with its IP address, without communicating with an address server, in response to an RSVP path message initiated by an RSVP capable proxy device associated with the destination host device. The RSVP path message is directed to the originating host device through the IP network. The IP connection is established, through the switched transport network and the destination bridging device, in response to a setup message directed to the switched transport network address of the destination bridging device.

The RSVP path message may contain at least one quality of service (QoS) parameter, which is passed to the setup message, so that the IP connection is established in accordance with the QoS parameter. The switched transport network may be an asynchronous transfer mode (ATM) network or a multi-protocol label switching (MPLS) network. When the switched transport network is an ATM network, each IP connection is a switched virtual circuit (SVC) connection. Also, the setup message may be a user-to-network interface (UNI) protocol message.

Another aspect of the present invention provides a method for implementing an IP connection, through a switched transport network, between an originating host device and a destination host device, connected through an IP network, the destination host device being incapable of RSVP signaling. The method includes communicating a request for the IP connection to an RSVP capable proxy signaling device associated with the destination host device, inserting a switched transport network address of a destination bridging device into a first data field of an RSVP path message received from the proxy signaling device, and forwarding the path message to an originating bridging device, through at least one router in the IP network by default routing. The router passes the path message without modifying the first data field.

A setup message is forwarded to the destination bridging device, through at least one switching device in the switched transport network, based on the destination bridging device address retrieved from the first data field. The setup message includes an RSVP reservation request message generated in response to the path message. The IP connection is established between the originating host device and the proxy signaling device, through the originating bridging device and the destination bridging device in response to the setup message. The proxy signaling device interfaces with the destination host device.

At least one QoS connection parameter may be included in a second data field of the path message received from the proxy signaling device. The second data field is included in the responsive reservation request message. The IP connection is then established in accordance with the QoS service connection parameter, which may include a bandwidth.

The method for implementing the short-cut connection may further include capturing the path message at the originating bridging device and storing the address of the first bridging device from the RSVP extension object in association with an address of the destination host device, provided by the proxy signaling device. The stored address of the destination bridging device is retrieved based on the address of the destination host device included in the responsive reservation request message. The setup message is then forwarded to the destination bridging device based on the retrieved address.

Another aspect of the present invention provides a method and a system for providing a guaranteed QoS IP session, through an ATM network, between an originating end-system and a destination end-system that is incapable of RSVP signaling and therefore interfaces with an RSVP capable proxy device. An initial IP session is established between the originating end-system and the destination end-system through an IP network. An RSVP path message, including at least one parameter defining a QoS, is received from the proxy device, on behalf of the destination end-system, at a destination interworking function (IWF) device.

An ATM address of the destination IWF device is inserted into a transport network hop (THOP) extension object of the path message. The path message is forwarded through the IP network by default routing to an originating IWF device without modifying the THOP extension object. The THOP extension object is then cached in association with an IP address of the destination end-system and a setup message is launched through the ATM network based on the associated THOP extension object and the IP address of the destination end-system. The setup message includes a responsive RSVP reservation request message, containing the QoS parameter. The setup message is received at the destination IWF device and an SVC connection is established between the destination IWF device and the originating IWF device in accordance with the QoS parameter. The reservation request message is forwarded to the proxy signaling device, which accepts the reservation request message on behalf of the destination end-system. The initial IP session is then shifted to the SVC connection.

Another aspect of the present invention provides a system for establishing an IP connection between an originating host device and a destination host device through a switched transport network, where the destination host device is incapable of RSVP signaling. The system includes an RSVP capable proxy device that interfaces with the destination host device to provide RSVP signaling and an originating bridging device that associates a switched transport network address and an IP address of a destination bridging device, without communicating with an address server, in response to an RSVP path message.

The RSVP path message is initiated by the proxy device and received by the originating host device through an IP network, and the originating bridging device responds with a setup message directed through the switched transport network to the switched transport network address of the destination bridging device. The IP connection is established, through the switched transport network and the proxy device, in response to the setup message. The setup message may include at least one predetermined bidirectional flow parameter received from the path message, so that the IP connection is established in accordance with the bidirectional flow parameter.

Another aspect of the present invention provides a system for establishing an IP connection between an originating end-system and a destination end-system, which is incapable of RSVP signaling. The system includes a proxy signaling device, which interfaces with the destination end-system, and a first IWF device, which inserts its switched transport network address into a first data field of an RSVP path message received from the proxy signaling device. The path message is forwarded through an IP network by default routing, which passes the path message without modifying the first data field. A second IWF device receives the path message and forwards a setup message to the first IWF device through the switched transport network, based on the first IWF device's address retrieved from the first data field of the path message. The setup message includes an RSVP reservation request message generated in response to the path message. The IP connection is established between the originating end-system and the destination end-system, through the first bridging device, the second bridging device and the proxy signaling device, in response to the setup message.

Yet another aspect of the present invention provides computer data signaling, embodied on a propagation medium, that enables an IP connection across a switched transport network between an originating host device and a destination host device, through a first bridging device and a second bridging device, where the destination host device is incapable of RSVP signaling. The computer data signaling includes first and second path message signals, a reservation request message signal and first and second setup message signals. The first path message signal is received from a proxy signaling device connected to the destination host device, and includes an address parameter for the second bridging device and an IP address of the proxy signaling device. The second path message signal is forwarded through an IP network without modification to the address parameter, and includes a switched transport network address of the second bridging device in the address parameter and the IP address of the proxy signaling device. The reservation request message signal is received by the first bridging device in response to the second path message, and includes the IP address of the proxy signaling device.

The first setup message signal is forwarded through the switched transport network to the transport network address of the second bridging device, retrieved from the second path message signal. The first setup message signal includes the reservation request message signal. The second setup message signal is forwarded to the IP address of the proxy signaling device, and includes the reservation request message signal. The IP connection is established in response to the second setup message signal.

The path message signals and the reservation request message signal may include a bidirectional flow parameter that defines at least one predetermined QoS attribute of the IP connection. The IP connection is then established in accordance with the QoS attribute, which may include a bandwidth. The path message signals and the reservation request message signal may further include a reverse charging parameter. Accounting data for the IP connection is associated with the originating host device when the reverse charging parameter is activated and with the destination host device when the reverse charging parameter is not activated. The path message signals and the reservation request message signal may comply with RSVP, and the setup message signals may comply UNI protocol.

The various aspects and embodiments of the present invention are described in detail below.

FIG. 1 is a diagram depicting an exemplary network infrastructure supporting the present invention. As stated above, the enhancements to RSVP enable short-cut IP connections to be established over switched networks. FIG. 1, in particular, depicts an exemplary ATM network 8 through which the short-cut IP connection may be established, operating in conjunction with the IP network 6. The present invention is not limited to ATM networks. The invention may be implemented over any RSVP capable switched network that interfaces with the IP network 6, including, for example, a multi-protocol label switching (MPLS) network. For example, in alternative embodiments, the switching network includes MPLS routers, optical switching devices controlled by generalized MPLS (GMPLS), or time division multiplex (TDM) switching devices controlled by GMPLS. The associated connection setup requests would be in accordance with RSVP-te or constraint-based routed label distribution protocol (CR-LDP).

The ATM network 8 includes ATM edge switch 22 and ATM edge switch 24. Although not pictured, the ATM network 8 may further include multiple ATM core switches situated between the edge switches without affecting implementation of the present invention. The IP network 6 is depicted to include IP router 14 and IP router 16. The IP network 6 may likewise include any number of intervening IP routers to enable best effort routing of IP traffic. The ATM network 8 and the IP network 6 share bridging devices to interface between the networks. In particular, both networks include an interworking function (IWF) device 12, through which the originating end-system 10 accesses the networks, and an IWF device 18, through which the destination end-system 20 accesses the networks. The IWF devices 10 and 18 may be multiple devices or any combination of hardware and software that translate between RSVP of the IP network 6 and user-to-network interface (UNI), or other signaling, of the ATM network 8. For example, the IWF device 12 may be a digital subscriber line (DSL) modem and the IWF device 18 may be an SVC router. The ATM network 8 uses a signaling protocol to allocate network resources and to establish SVCs, which are dynamically set up and removed according to need (as opposed to permanently configured PVCs).

Each of the IWF devices 12 and 18 include two physical ports. One port interfaces with the local area network (LAN), through which they respectively communicate with the originating IP end-system 10 and the destination IP end-system 20. The other physical port interfaces with a wide area network (WAN), such as the ATM network 8. The WAN port includes multiple logical ports, depending on the number of sessions to be established through the WAN.

In an embodiment of the invention, the originating end-system 10 and the destination end-system 20 are RSVP capable IP devices. The end-systems may include, for example, individual personal computers or workstations, enterprise networks, ISPs and peer networks. A typical implementation is the originating end-system 10 being an Internet service subscriber and the destination end-system 20 being an ISP. The originating end-system 10 maintains its own IP address, domain naming system (DNS) and other IP configurations. The DNS translates the name of the originating end-system 10 into an IP address or a universal resource locator (URL).

Figure 4:
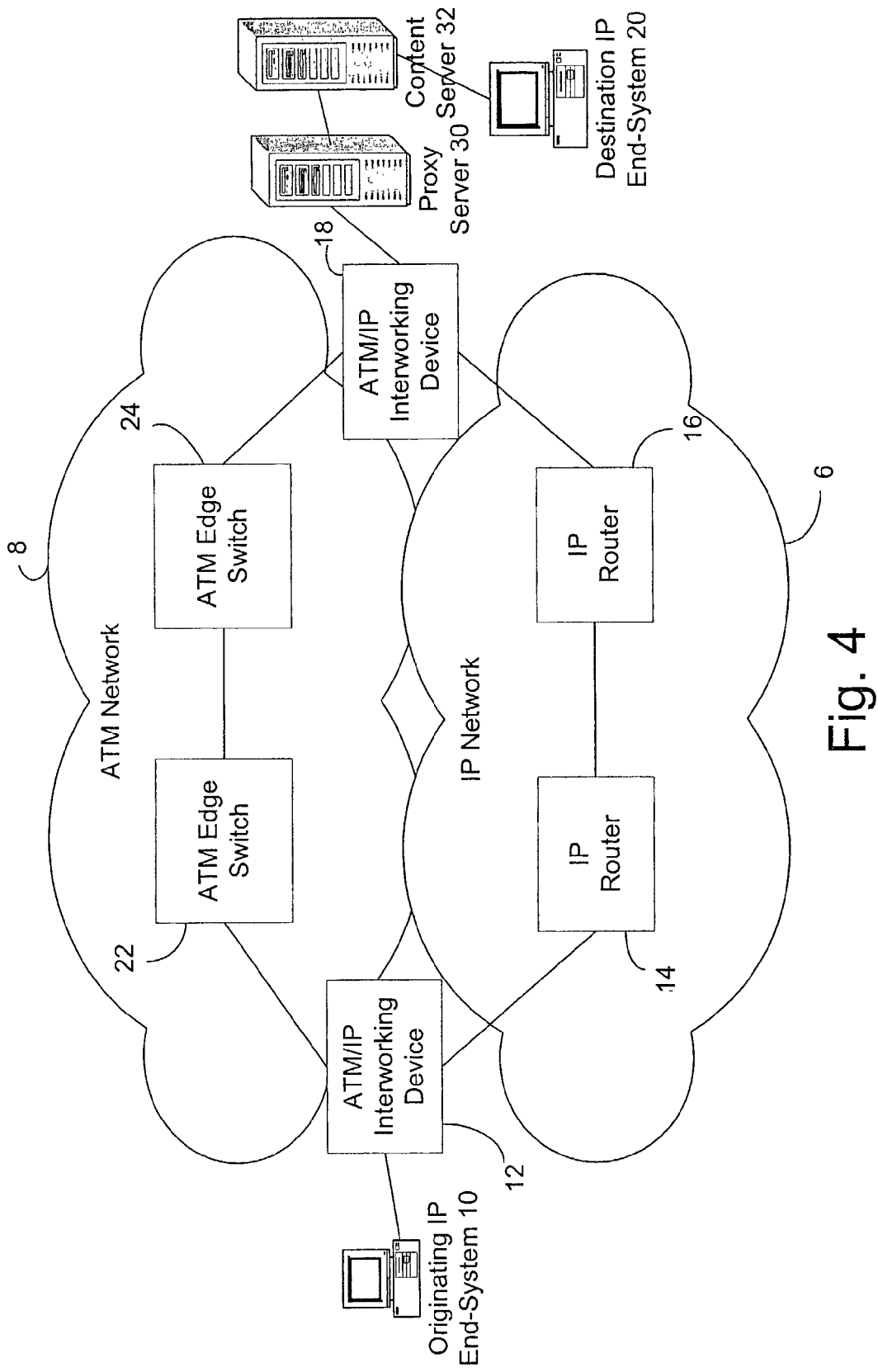
FIG. 4 is a diagram showing an exemplary network infrastructure, including a proxy server for a non-RSVP capable destination end-system, according to an aspect of the present invention.

In an alternative embodiment, an example of which is shown in FIG. 4, one or both end-systems are not RSVP capable, in which case a proxy must be incorporated to enable the RSVP communications. A proxy is a device, other than an end-system, that provides appropriate signaling on behalf of the end-systems for communications to be established. An advantage of using a proxy is that the invention may be implemented in existing networks without modifying every IP device to accommodate RSVP signaling. For example, when the destination end-system 20 is not RSVP capable, it connects to a proxy server 30, as shown in FIG. 4. The proxy server 30 then initiates the RSVP messaging to enable the short-cut IP connection over the ATM network 8, or other transport networks, as described in detail below.

As stated above, the originating end-system 10 that desires a short-cut IP connection through the ATM network 8 conventionally establishes an IP session with the destination end-system 20, using best effort routing based on TCP/IP and UDP/IP, for example, and the IP addresses of the two end-systems. The short-cut will be set up using RSVP, which reserves a communications route between the end-systems based on RSVP messages passed through the IP network 6 and ultimately the ATM network 8. The basic RSVP message types include path (PATH) messages, reservation request (RESV) messages, path tear down (PATH-TEAR) messages, reservation tear down (RESVTEAR) messages and reservation confirmation (RESVCONF) messages.

Generally, the conventional PATH messages defines the communication path by traveling downstream through the IP network from the originating end-system 10 to the destination end system 20, following the same best effort route as the data packets in the IP session. Typically, a PATH message causes each router to store the IP address of the previous router to enable a corresponding RESV message to travel upstream along the same route, in the reverse direction.

The PATH message reaches the destination end-system 20, which generates and sends the corresponding RESV message. Each router sequentially receives the RESV message, which includes information regarding the functionality of the previous router, and accepts or rejects the reservation. When a reservation is accepted, the router sends an RESV message to the next router on the path. When the RESV message reaches the originating end-system, the reservation is established through the IP network between the two end-systems. When the end-system 20, which initiates the RESV message, requests confirmation through the RESV message, an RESVCONF message is returned to confirm the reservation. The end-systems may terminate the path by sending a PATHTEAR message, which flows in the same direction as the PATH message, or an RESVTEAR message, which flows in the same direction as the RESV message.

The RSVP messages include various objects defining parameters of the requested connection. Examples of conventional RSVP objects include the FLOWSPEC object, the SENDER_TEMPLATE object and the SESSION object. The FLOWSPEC object describes the specifications of the traffic stream sent from the originating end-system 10, including the required QoS of the desired connection, and the service requirements of the application. The SENDER_TEMPLATE object provides the source IP address and the source port number, which correspond to the originating end-system 10. The SESSION object provides the destination IP address and the destination port number, which correspond to the destination end-system 20.

Conventionally, the switched network includes a server, e.g., an ARP server, accessible by the IWF devices 12 and 18 to associate the IP addresses of the end-systems 10 and 20 and the IWF devices 12 and 18 with the respective switched network (e.g., ATM network) addresses, enabling translation of the IP address to the ATM address. For example, an ARP server may perform the IP to ATM address translation for end-systems and routers within a local IP subnet (LIS). The present invention eliminates the need for the server based on enhancements to RSVP.

In particular, an RSVP extension that defines a transport network hop (THOP) is included in the RSVP messaging. THOP may include up to three additional classes of objects: RSVP_THOP, RSVP_CYSPEC and RSVP_SVCSPEC. In an embodiment of the invention, the RSVP_THOP class includes three objects, each of which may only be included in the RSVP PATH message as it traverses the IP network between the originating end-system 10 and the destination end-system 20. The objects follow the format described, for example, in Request for Comment (RFC) 2205, "Resource Reservation Protocol (RSVP)—Version 1 Functional Specification," the disclosure of which is expressly incorporated by reference herein in its entirety. The class number should be at least 192 (e.g., 11bbbbbb, where 1 is a mandatory bit and b is optional) to assure proper routing.

Each of the objects represent the address of the previous hop located in a switched network, e.g., the ATM network 8 or an MPLS network. The first two objects of the RSVP_THOP class represent addresses in an MPLS network. For example, the first object is the IPv4 RSVP_THOP object, which represents the IP address of the previous hop in an MPLS network using the IPv4 protocol. The object contains 4 octets to accommodate the 32 bit address field associated with conventional IP addresses. The second object is the IPv6 RSVP_THOP object, which represents the IP address of the previous hop in an MPLS network using the IPv6 protocol. The object contains 16 octets to accommodate the expanded 128 bit address field. The IPv6 protocol enables additional features of the MPLS network, including enhanced security and multicasting, for example. The third object is the ATM RSVP_THOP object, which represents the address of the previous hop located in the ATM network 8. The object may contain 20 octets to accommodate network service access point (NSAP) addressing.

Each of the objects in the RSVP_THOP class essentially function in the same manner with respect to representing transport network addresses of MPLS or ATM switching devices, according to the alternative embodiments of invention. Therefore, the implementation of the ATM RSVP_THOP object in an ATM network, as described below, is equally applicable to the IPv4 and IPv6 RSVP_THOP objects in an MPLS network.

The ATM RSVP_THOP object carries the ATM transport network address of the originating interface or bridging device, such as the IWF device 12, through which the PATH message was most recently sent. Only nodes or routers that interface with both the initial transport network (e.g., the IP network 6) and a different, switched transport network (e.g., the ATM network 8) respond to the ATM RSVP_THOP object. For example, the IWF device 12 inserts its ATM address into the ATM RSVP_THOP object and the IWF device 18 retrieves the address, while all other IP devices, such as the IP network routers 14 and 16, pass the ATM RSVP_THOP object without modification. Multiple ATM RSVP_THOP objects may be included in the same PATH message to accommodate interim IWF devices. The order of the multiple objects is last-in-first-out (LIFO).

The RSVP_CYSPEC class has a class number different from the RSVP_THOP class and includes one object, for example, which may be included in the RSVP PATH and RESV messages. The object is the RSVP_CYSPEC object, which represents bidirectional flow specifications. The object includes a TSPEC field and an RSPEC field, each of which includes RSVP FLOWSPEC data without the header, e.g., as described in RFC 2210, "The Use of RSVP with IETF Integrated Services," the disclosure of which is expressly incorporated by reference herein in its entirety. The TSPEC field describes the sending flow specifications (e.g., the ingress QoS) and the RSPEC field describes the receiving flow specifications (e.g., the egress QoS). Accordingly, the RSVP_CYSPEC object is able to describe the QoS which the short-cut IP connection must support.

The RSVP_SVCSPEC class has another class number, different from the RSVP_CYSPEC and RSVP_THOP classes, and includes one object, which may be contained in the RSVP PATH and RESV messages. The object is the RSVP_SVCSPEC object, which represents the service specifications and supports value-added RSVP service signaling among the IP devices. The object includes a reverse charge indicator field to indicate whether the RSVP PATH message sender, e.g., the originating end-system 10, is to pay for the connection. The reverse billing enabled by the RSVP_SVCSPEC object is necessary because the switched network through which the IP short-cut connection is established treats the RSVP PATH message receiver, e.g., the destination end-system 18, as the calling party even though the connection is initiated by the originating end-system 10. The reverse billing enables accounting data to be associated with the originating end-system 10, which may then be billed for the connection, when appropriate.

Accordingly, the reverse charge indicator of the RSVP_SVCSPEC object contains a Boolean value. A value of 1 (TRUE) indicates that the called party, e.g., the originating end-system 10, is to be billed. A value of 0 (FALSE) indicates the called party not be billed. In other words, the calling party, e.g., the destination end-system 20, is billed or the call is toll free. The destination IWF device 18 sets the reverse charge indicator in the switched network call setup message when the RSVP_SVCSPEC object indicates a value of 1. When the switching network UNI signaling does not support reverse charging, the interworking device rejects the RSVP message and generates a corresponding error message.

Figure 2:
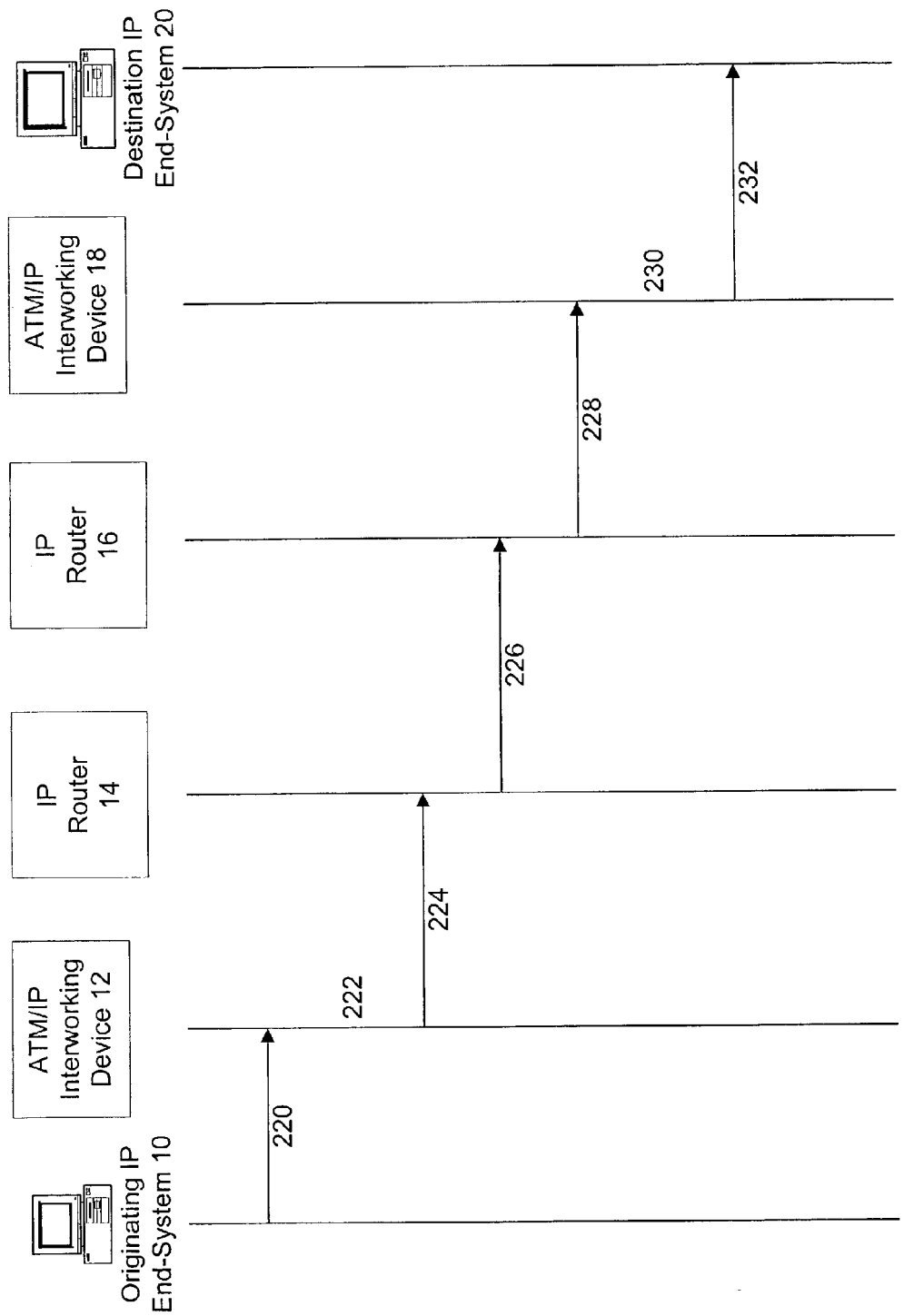
FIG. 2 is a flow diagram illustrating an RSVP PATH procedure of an originating end-system, according to an aspect of the present invention.
Figure 3:
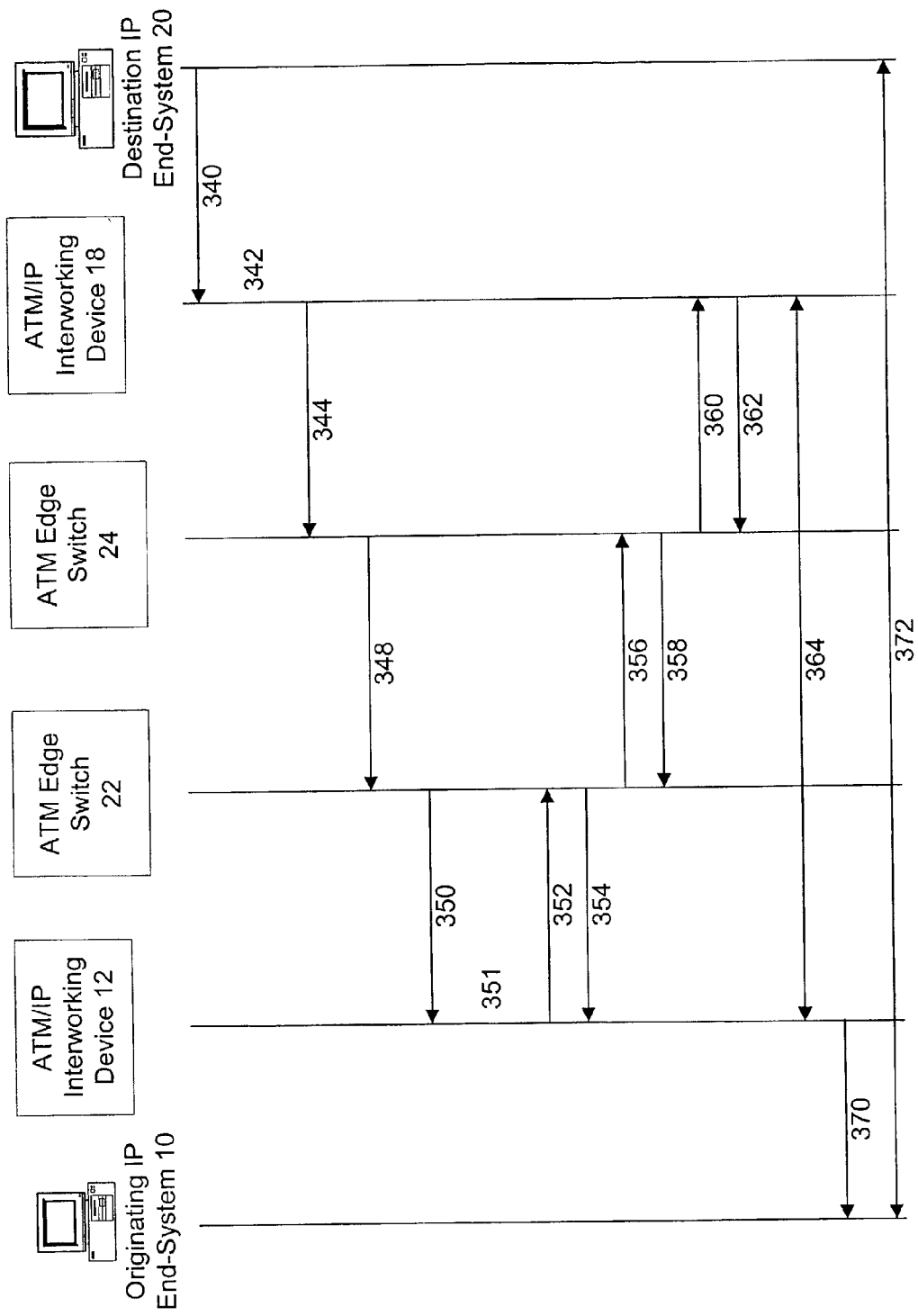
FIG. 3 is a flow diagram illustrating an RSVP RESV procedure of a destination end-system corresponding to the RSVP path procedure of FIG. 2, according to an aspect of the present invention.

FIGS. 2 and 3 are flow diagrams illustrating an exemplary RSVP-based guaranteed QoS IP connection over the ATM network 8. FIG. 2 depicts an RSVP path procedure initiated by the originating end-system 10. In particular, the originating end-system 10, or the initiating host, desiring the IP short-cut connection through the ATM network 8 conventionally establishes a default IP connection with the destination end-system 20 using best effort routing, e.g., TCP/IP or UDP/IP, and the IP addresses of the two end-systems. An RSVP session may be initiated using RSVP with minor extension. When the originating end-system 10 requests a short-cut connection over the ATM network 8, e.g., as a result of specific QoS session requirements, the connection may be dynamically established between the bridging devices, IWF device 12 and IWF device 18, each of which is capable of translating between RSVP and UNI protocol signaling. The general connection setup protocol between the IWF devices and the ATM network 8 may be UNI signaling with confirmation procedure, such as ATM UNI Specification—version 3.1 or version 4.0.

To establish the short-cut IP connection, the originating end-system 10 generates and sends an RSVP PATH message to the IWF device 12 at step 220 of FIG. 2. The connection between the originating end-system 10 and the IWF device 12 is established through regular IP connectivity, such as IP over Ethernet. According to the invention, the PATH message includes the QoS specifications for the desired connection, such as the bidirectional QoS specification object RSVP_CYSPEC, which describes the ingress QoS and the egress QoS. The RSVP_CYSPEC object is associated with, and may replace, standard routing RSVP objects, such as the RSVP SENDER_TEMPLATE object, which provides the IP address and the port number of the originating end-system 10, and the RSVP SESSION object, which provides the IP address and the port number of the destination end-system 20.

At step 222, the originating IWF device 12 captures the PATH message and inserts its ATM address, e.g., the ATM network service access point (NSAP) address, into the PATH message as the ATM RSVP-THOP object, discussed above. The IWF device 12 also caches the PATH message for comparison to the returned RESV message, discussed below. The PATH message travels downstream from the IWF device 12 to the destination IWF device 18, following the same route as the regular data packets. In particular, the IWF device 12 forwards the PATH message, including the ATM RSVP_THOP object, to the IP router 14 at step 224, which routes the PATH message to the IP router 16 at step 226. The IP router 16 then routes the PATH message to the destination IWF device 18 at step 228. Significantly, even though the default connection routers, e.g., the IP router 14 and the IP router 16, typically modify the previous hop address passed in the PATH message, they do not modify the ATM RSVP_THOP object.

In the depicted embodiment of the invention, the IP transport network 6 carrying the default connection is separate from the ATM network 8, which includes the ATM edge switches 22 and 24. However, alternative embodiments include the default IP connection being carried by the same ATM network through which the short-cut is ultimately established.

At step 230, the IWF device 18 captures the PATH message and caches the mapping of the IP address of the originating end-system 10 to the address in the ATM RSVP_THOP object and forwards the PATH message to the destination end-system 20. The destination end-system 20 receives and validates the PATH message. In an embodiment of the invention, the IWF device 18 removes the ATM RSVP_THOP object before passing the PATH message to the destination end-system 20. Removing the object avoids the possibility of the destination end-system 20 not recognizing the ATM RSVP_THOP object and rejecting the connection.

FIG. 3 is a flow diagram depicting the RSVP reserve messaging (RESV) sent through the ATM network 8 in response to the received RSVP PATH message. The destination end-system 20 generates and sends an RSVP RESV message to the IWF device 18 at step 340. Like the PATH message, the RESV message may contain an RSVP_CYSPEC extension object, confirming bidirectional traffic characteristics of the QoS IP flow, instead of the RSVP_FLOWSPEC object. When the RESV message does not contain the RSVP_CYSPEC object, the upstream traffic characteristics of the bidirectional shortcut are handled according to local protocol. In an embodiment of the invention, the upstream QoS may be algorithmically calculated from the RSVP_FLOWSPEC object. The RESV message may further contain the RSVP_SVCSPEC object to enable reverse billing, when necessary.

The IWF device 18 initially captures the RESV message at step 342. To establish an ATM SVC at the requested QoS through broadband access lines, such as DSL, Ethernet or TDM, the IWF device 18 launches a call setup message, e.g., an ATM UNI signaling protocol SETUP message, to the longest short-cut bridging device address indicated by the previously cached ATM RSVP_THOP object. In the present example, the longest short-cut bridging device address is the ATM address of the IWF device 12. In other words, had the PATH message passed through intermediate IWF devices, which had respectively inserted additional ATM RSVP_THOP objects, the SETUP message would be directed to the address contained in the first inserted ATM RSVP_THOP object, i.e., the originating IWF device 12. The UNI signaling enables the transfer of information across the ATM network 8. For example, the user-to-user information element (UU IE) of the UNI SETUP message may contain the RSVP RESV message to be sent across the ATM network 8 to the IWF device 12. The assignment of the RESV message in UU IE follows routing protocol criteria RFC 3033, "The Assignment of the Information Field and Protocol Identifier in the Q.2941 Generic Identifier and the Q.2957 User-to-User Signaling for the Internet Protocol," the disclosure of which is expressly incorporated by reference herein in its entirety.

The IWF device 18 initially sends the SETUP message, along with the RESV message, to the ATM edge switch 24 at step 344. The ATM edge switch 24 confirms receipt of the SETUP message and forwards the message to the ATM edge switch 22 at step 348. The message may also pass through intervening ATM core switches in the ATM network 8 (not pictured), using private network-to-network interface (PNNI) signaling protocol, for example. The ATM edge switch 22 forwards the SETUP message to the IWF device 12 at step 350.

The IWF device 12 validates the UNI SETUP and the RESV messages with the cached PATH message at step 351. Also, to confirm the connection across the ATM network 8, the IWF device 12 sends a CONN message to the ATM edge switch 22 at step 352, which acknowledges the confirmation signal by returning a CONN ACK message to the IWF device 12 at step 354. Likewise, the ATM edge switch 22 sends a CONN message to the ATM edge switch 24 at step 356, which returns a CONN ACK message at step 358. The ATM edge switch 24 sends a CONN message to the IWF device 18 at step 360, which returns a CONN ACK message at step 362, completing the connection confirmation cycle.

Meanwhile, after the originating IWF device 12 validates the UNI SETUP message and the RSVP RESV message, an ATM SVC at the requested QoS is setup between the originating IWF device 12 and the destination IWF device 18 through broadband access lines, as indicated by step 364. The SVC provides a short-cut between the IWF devices by bypassing the IP network 6. The IWF device 18 accordingly creates an entry in its forwarding table indicating the successful setup of the ATM SVC, an example of which is shown in Table 1.

TABLE 1

| Destination IP | Source IP | Port | Forward to Interface |
|---|---|---|---|
| Any local or private address | * | * | LAN |
| originating end-system 10 | destination end-system 20 | TCP/UDP port | WAN—new QoS SVC |
| * | * | * | WAN—default ATM connection |

The first three columns of Table 1 indicate the incoming interface of the IWF device 18 and the last column indicates the outgoing interface of the IWF device 18. Therefore, as indicated by the first row of Table 1, when the destination IP data received at the IWF device 18 indicates any local or private IP address, the IWF device 18 directs the associated connection through the LAN interface. The asterisks in the first row indicate that the source IP address and the port information does not affect the forward to interface when the destination IP data indicates a local or private IP address.

As indicated by the second row of Table 1, when data is received at the TCP/UDP port and provides that the destination IP address is the originating end-system 10 and the source IP address is the destination end-system 20, the output of the IWF device 18 directs the connection over the new short-cut SVC through the WAN interface, identified by an associated virtual path indicator (VPI) and virtual channel indicator (VCI). As indicated by the asterisks in the third row of Table 1, incoming data directed to a port other than the TCP/UDP port, or indicating destination and source IP addresses other than the originating end-system 10 and the destination end-system 20, respectively, invoke the default ATM connection of the WAN interface.

Similarly, the IWF device 12 creates an entry in its forwarding table indicating the successful setup of the ATM SVC, an example of which is shown in Table 2.

TABLE 2

| Destination IP | Source IP | Port | Forward to Interface |
|---|---|---|---|
| Any local or private address | * | * | LAN |
| destination end-system 10 | originating end-system 20 | TCP/UDP port | WAN—new QoS SVC |
| * | * | * | WAN—default ATM connection |

The IWF device 12 also forwards the RESV message to the originating end-system 10 at step 370. When the originating end-system 10 accepts the RESV message, a short-cut IP connection at the requested QoS is available over the newly established SVC between the IWF device 12 and the IWF device 18, enabling communication between the originating end-system 10 and the destination end-system 20, indicated at step 372. The short-cut IP connection is based on RFC 1483, "Multiprotocol Encapsulation Over ATM Adaptation Layer 5," the disclosure of which is expressly incorporated by reference herein in its entirety. After the short-cut is established and available at step 372, the QoS IP session is moved from the IP network 6 to the new SVC based QoS short-cut in the ATM network. In other words, the IP traffic travels the dedicated QoS short-cut path between the originating end-system 10 and the destination end-system 20 through the ATM switches 22 and 24, as opposed to the hop-by-hop default IP path through the IP routers 14 and 16.

Typically, the SVC is torn down through ATM UNI signaling. Furthermore, the soft state natural of the RSVP 2205 protocol is maintained at the IP devices, including the IWF devices 12 and 18, to avoid an orphaned QoS short-cut when the IP session is disconnected by default. Substantial losses of RSVP refreshment messages will cause the QoS short-cut to automatically tear-down through the UNI signaling. Also, either the originating end-system 10 or the destination end-system 20 may cause the SVC to be torn down by sending an RSVP PATHTEAR or RESVTEAR message, respectively. The IWF devices 12 and 18 respond by tearing down the ATM SVC, along with the RSVP session.

The traffic characteristics of the QoS short-cut are constructed from RSVP traffic characteristics objects according to RFC 2210, "The Use of RSVP with IETF Integrated Services;" RFC 2211, "Specification of the Controlled-Load Network Element Service;" and RFC 2212, "Specification of Guaranteed Quality of Service," the disclosures of which are expressly incorporated by reference herein in their entireties. For ATM SVC networks in particular, the traffic characteristics are constructed from RSVP traffic characteristics objects according to RFC 2381, "Inter-operation of Controlled-Load Service and Guaranteed Service with ATM," and RFC 2382, "A Framework for Integrated Service and RSVP over ATM," the disclosures of which are expressly incorporated by reference herein in their entireties.

The present invention further enables multiple simultaneous IP short-cut connections among multiple endpoints. Each IP connection is a point-to-point connection with a unique set of connection parameters, including a source address, source port number, destination address and destination port number, suitable for IP virtual private network (VPN) service with specific QoS requirements. At least one of the four parameters must be different in order to enable a simultaneous IP short-cut connection. For example, different addresses for the destination end-systems, as well as different port assignment for each connection, enable the simultaneous IP short-cut connections from the originating end-system 10.

Setting up each of the additional simultaneous connections involves essentially the same processing steps described above. Generally, the originating IWF device 12 captures the PATH message from the originating end-system 10, including the ATM RSVP_THOP object, and inserts its ATM address as the ATM RSVP_THOP object. The IP routers forward the PATH message to an appropriate destination IWF device (which may be different from the destination IWF device 18) without altering the ATM RSVP_THOP. The destination IWF device forwards the PATH message to a second destination end-system, which receives and validates the PATH message.

The second destination end-system then generates and sends a corresponding RSVP RESV message. A UNI SETUP message, containing the RSVP RESV message, is routed by the destination IWF device through the ATM network 8 to the originating IWF device 12 based on the ATM address previously inserted as the ATM RSVP_THOP object. A second ATM SVC connection is established between the originating IWF device 12 and the destination IWF device at the requested QoS. As stated above, to enable the second ATM SVC connection, there must be at least one connection parameter (e.g., the source address, the source port number, the destination address and/or the destination parameter) that is different from the corresponding connection parameter associated with the first ATM SVC connection. The originating IWF device 12 forwards the RSVP RESV message to the originating end-system 10 to complete the ATM SVC between the originating end-system 10 and the second destination end-system.

The present invention also enables the originating end-system 10 to be temporarily assigned alternate IP addresses, associated with a particular destination address. For example, when the originating end-system 10 has a public IP address, and the user wishes to access a private or secure network, the destination end-system within the desired network must generate an alternate IP address to enable the session. For generating a temporary IP address, the process is essentially the same as described above with respect to FIGS. 2 and 3, with the addition of a dynamic host configuration protocol (DHCP) extension object in the RSVP messaging. The DHCP extension object enables a TCP/IP host, e.g., the originating end-system 10, to receive temporary (as well as permanent) IP addresses from centrally administered servers, for example, at the direction of the destination end-system 20.

Accordingly, the originating end-system 10 generates and sends RSVP PATH messages corresponding to the desired IP connection with the destination end-system 20 to the IWF device 12 at step 220 of FIG. 2 through regular IP connectivity. Each PATH message must include the DHCP extension object. Each PATH message may likewise contain the bidirectional QoS specification object RSVP_CYSPEC, which describes the ingress QoS and the egress QoS for the IP connection.

The originating IWF device 12 captures the PATH message at step 222 and inserts its ATM address into the PATH message as the ATM RSVP-THOP object. The IWF device 12 caches the PATH message for comparison to the returned RESV message. The PATH message, including the DHCP extension object and the ATM RSVP_THOP object, travels downstream from the IWF device 12 to the IP router 14 at step 224, the IP router 16 at step 226 and the destination IWF device 18 at step 228. As described above, the IP router 14 and the IP router 16 do not modify the ATM RSVP_THOP object upon receipt of the PATH message. At step 230, the IWF device 18 captures the PATH message, caches the mapping of the IP address of the originating end-system 10 to the address in the ATM RSVP_THOP object and removes the ATM RSVP_THOP object.

At step 232, the IWF device 18 passes the PATH message to the destination end-system 20, which receives and validates the PATH message. The destination end-system 20 responds by generating an RSVP RESV message with a DHCP extension object (i.e., DHCP response), which includes a newly assigned IP address associated with the originating end-system 10.

Referring again to FIG. 3, the destination end-system 20 sends the RSVP RESV message to the IWF device 18 at step 340. Like the PATH message, the RESV message may contain an RSVP_CYSPEC extension object, confirming bidirectional traffic characteristics of the QoS IP flow. The RESV may further contain the RSVP_SVCSPEC object to enable reverse billing, as discussed above. The IWF device 18 captures the RESV message at step 342 and establishes an ATM SVC at the requested QoS through broadband access lines. In particular, the IWF device 18 launches the ATM UNI signaling protocol SETUP message to the address of the previously cached ATM RSVP_THOP object, which is the ATM address of the IWF device 12. The UNI SETUP message contains the RSVP RESV message, including the DHCP response, which is sent across the ATM network 8 to the IWF device 12.

The IWF device 18 initially sends the SETUP message, along with the RESV message, to the ATM edge switch 24 at step 344. The ATM edge switch 24 confirms receipt of the SETUP message and forwards the message (through any intervening ATM core switches) to the ATM edge switch 22 at step 348. The ATM edge switch 22 forwards the SETUP message to the originating IWF device 12 at step 350. The IWF device 12 validates the UNI SETUP and the RESV message with the cached PATH message at step 351. Also, to confirm the IP connection across the ATM network 8, the IWF device 12 sends a CONN message to the ATM edge switch 22 at step 352, which acknowledges the confirmation signal by returning a CONN ACK message to the IWF device 12 at step 354. Likewise, the ATM edge switch 22 sends a CONN message to the ATM edge switch 24 at step 356, which returns a CONN ACK message at step 358. The ATM edge switch 24 sends a CONN message to the IWF device 18 at step 360, which returns a CONN ACK message at step 362, completing the connection confirmation cycle.

Meanwhile, after the originating IWF device 12 validates the UNI SETUP message and the RSVP RESV message, an ATM SVC at the requested QoS is set up between the originating IWF device 12 and the destination IWF device 18 for one of the multiple connections, as indicated at step 364. The IWF device 18 then creates an entry in its forwarding table indicating the successful setup of the ATM SVC, including the IP address assigned by the destination end-system 20 to the originating end-system 10, an example of which is shown in Table 3.

TABLE 3

| Destination IP | Source IP | Port | Forward to Interface |
| --- | --- | --- | --- |
| Any local or private address | * | * | LAN |
| new IP address assigned to the originating end-system 10 | * | * | WAN—new QoS SVC |
| * | * | * | WAN—default ATM connection |

The first three columns of Table 3 indicate the incoming interface of the IWF device 18 and the last column indicates the outgoing interface of the IWF device 18. Therefore, as indicated by the first row of Table 3, when the destination IP data received at the IWF device 18 indicates a local or private IP address, the IWF device 18 directs the associated connection through the LAN interface, as discussed above with respect to Table 1. As indicated by the second row of Table 3, when data received on any port indicates that the destination IP address is the newly assigned IP address of the originating end-system 10, the output of the IWF device 18 directs the connection over the new short-cut SVC through the WAN interface, identified by an associated VPI and VCI.

As indicated by the asterisks across the third row of Table 3, incoming data indicating any other destination IP address or source IP address invokes the default ATM connection of the WAN interface.

The IWF device 12 similarly creates an entry in its forwarding table indicating the successful setup of the ATM SVC, also including the IP address assigned by the destination end-system 20 to the originating end-system 10, an example of which is shown in Table 4.

TABLE 4

| Destination IP | Source IP | Port | Forward to Interface |
|---|---|---|---|
| Any local or private address | * | * | LAN |
| * | new IP address assigned to the originating end-system 10 | * | WAN—new QoS SVC |
| * | * | * | WAN—default ATM connection |

The IWF device 12 also forwards the RESV message to the originating end-system 10 at step 370. The originating end-system 10 obtains the newly assigned IP address from the DHCP response contained in the RSVP message, as well as other IP configuration information, such as DNS. The originating end-system 10 then installs the new IP interface based on the IP configuration information. An RFC 1483 based IP connection between the originating end-system 10 and the destination end-system 20 at the requested QoS is available over the newly established SVC between the IWF device 12 and the IWF device 18, indicated by step 372. After the short-cut is established and available at step 372, the QoS IP session is moved from the IP network 6 to the new SVC based QoS short-cut in the ATM network. In other words, the IP traffic then travels the short-cut path between the originating end-system 10 and the destination end-system 20 through the ATM switches 22 and 24, as opposed to the hop-by-hop default IP path through the IP routers 14 and 16.

Notably, the originating end-system 10 may initiate additional, simultaneous IP connections to other destinations following the same steps discussed above with respect to FIG. 2. Because the additional IP connections may not include the destination end-system 20, the IP router 16, the IWF device 18 and the ATM edge switch 24 may not be involved. However, similar devices will be used to route and process the RSVP and UNI messages to establish the simultaneous, multiple IP short-cut connections across the ATM network 8. Each of the QoS short-cut connections may treat the originating end-system 10 as having a unique IP address, generated in response to the DHCP extension object.

Setting up each of the additional simultaneous connections involves the same processing steps described above. Generally, the originating IWF device 12 captures the PATH message from the originating end-system 10, including the ATM RSVP_THOP object and the DHCP extension object, and inserts its ATM address as the ATM RSVP_THOP object. The IP routers forward the PATH message to an appropriate destination IWF device without altering the ATM RSVP_THOP. The destination IWF device forwards the PATH message to a second destination end-system, which receives and validates the PATH message.

The second destination end-system then generates and sends a corresponding RSVP RESV message, including a DHCP response with another newly assigned IP address associated with the originating end-system 10. A UNI SETUP message, containing the RSVP RESV message, is routed by the second destination IWF device through the ATM network 8 to the originating IWF device 12 based on the ATM address previously inserted as the ATM RSVP_THOP object. A second ATM SVC connection is established between the originating IWF device 12 and the second destination IWF device at the requested QoS. The originating IWF device 12 forwards the RSVP RESV message to the originating end-system 10, which obtains the newly assigned IP address from the DHCP response from the RSVP message, to complete the ATM SVC between the originating end-system 10 and the second destination end-system using the second newly assigned IP address.

As discussed above, an alternative embodiment of the invention includes the use of proxy devices to accommodate IP devices having no RSVP capability. For example, FIG. 4 is a diagram depicting an exemplary network infrastructure that includes a proxy server 30 and a content server 32 associated with the destination end-system 20, which is not RSVP capable. The proxy server 30 is RSVP capable and generates the appropriate RSVP signaling on behalf of the destination end-system 20 based on flow information obtained from the content server 32. The flow information includes, for example, the source IP address, the destination IP address, the port identifier, the ingress QoS and the egress QoS.

Figure 5:
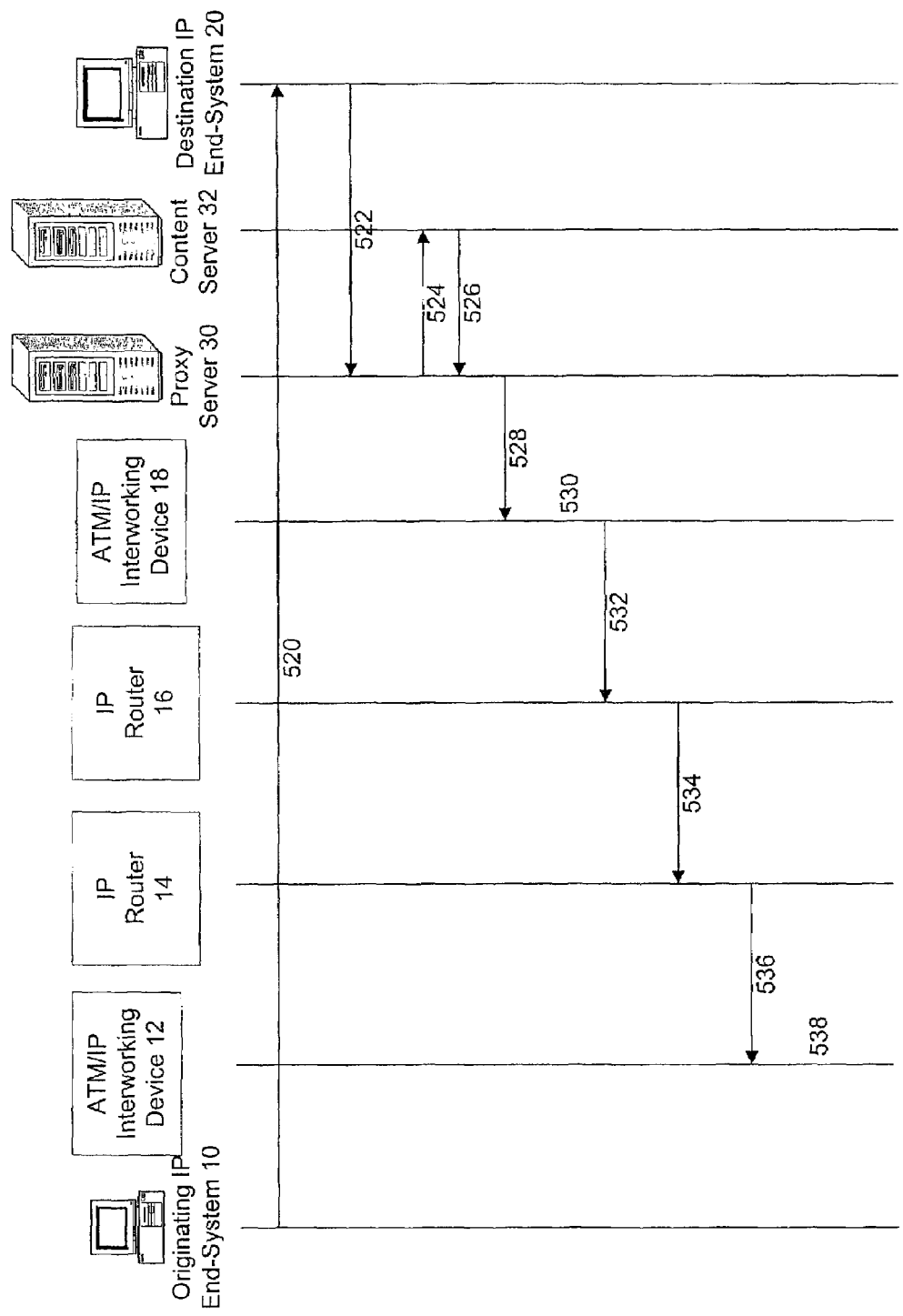
FIG. 5 is a flow diagram illustrating an RSVP PATH procedure of a non-RSVP capable destination end-system, according to an aspect of the present invention.

FIG. 5 is a flow diagram illustrating an RSVP PATH procedure involving the non-RSVP capable destination end-system 20. As described with respect to the RSVP capable destination end-system 20, the originating end-system 10 desiring the short-cut IP connection first conventionally establishes a default IP connection with the destination end-system 20 at step 520 using the default routing, e.g., best effort routing, and the IP addresses of the two end-systems. However, the originating end-system 10 does not initiate the RSVP PATH message. Rather, the destination end-system 20 communicates the QoS IP session request to the proxy server 30 at step 522 through the content server 32. The proxy server 30 obtains the flow information from the content server 32 at steps 524 and 526.

To establish the short-cut IP connection, the proxy server 30 generates and sends an RSVP PATH message to the IWF device 18 at step 528. The connection between the proxy server 30 and the IWF device 18 is established through regular IP connectivity. The PATH message includes the RSVP extension objects discussed above, such as the reverse charging object RSVP_SVCSPEC and the bidirectional QoS specification extension object RSVP_CYSPEC. The RSVP_CYSPEC object is associated with, and may replace, standard routing RSVP objects, such as the RSVP SENDER_TEMPLATE object, which provides the IP address and the port number of the destination end-system 20, and the RSVP SESSION object, which provides the IP address and the port number of the originating end-system 10. The RSVP_SVCSPEC object indicates to the network carrier that the destination end-system 20 will take the usage charge of the ATM SVC.

At step 530, the originating IWF device 18 captures the PATH message and inserts its ATM address into the PATH message as the ATM RSVP-THOP object. The IWF device 18 also caches the PATH message for comparison to the returned RESV message, discussed below. The PATH message travels from the IWF device 18 to the destination IWF device 12, following the same route as the regular data packets. In particular, the IWF device 18 forwards the PATH message, including the ATM RSVP_THOP object, to the IP router 16 at step 532, which routes the PATH message to the IP router 14 at step 534. The IP router 14 then routes the PATH message to the originating IWF device 12 at step 536. As discussed above, the IP router 14 and the IP router 16 do not modify the ATM RSVP_THOP object upon receipt of the PATH message. At step 538, the IWF device 12 captures the PATH message and caches the mapping of the IP address of the destination end-system 20 (i.e., the content server 32) to the address in the ATM RSVP_THOP object.

Figure 6:
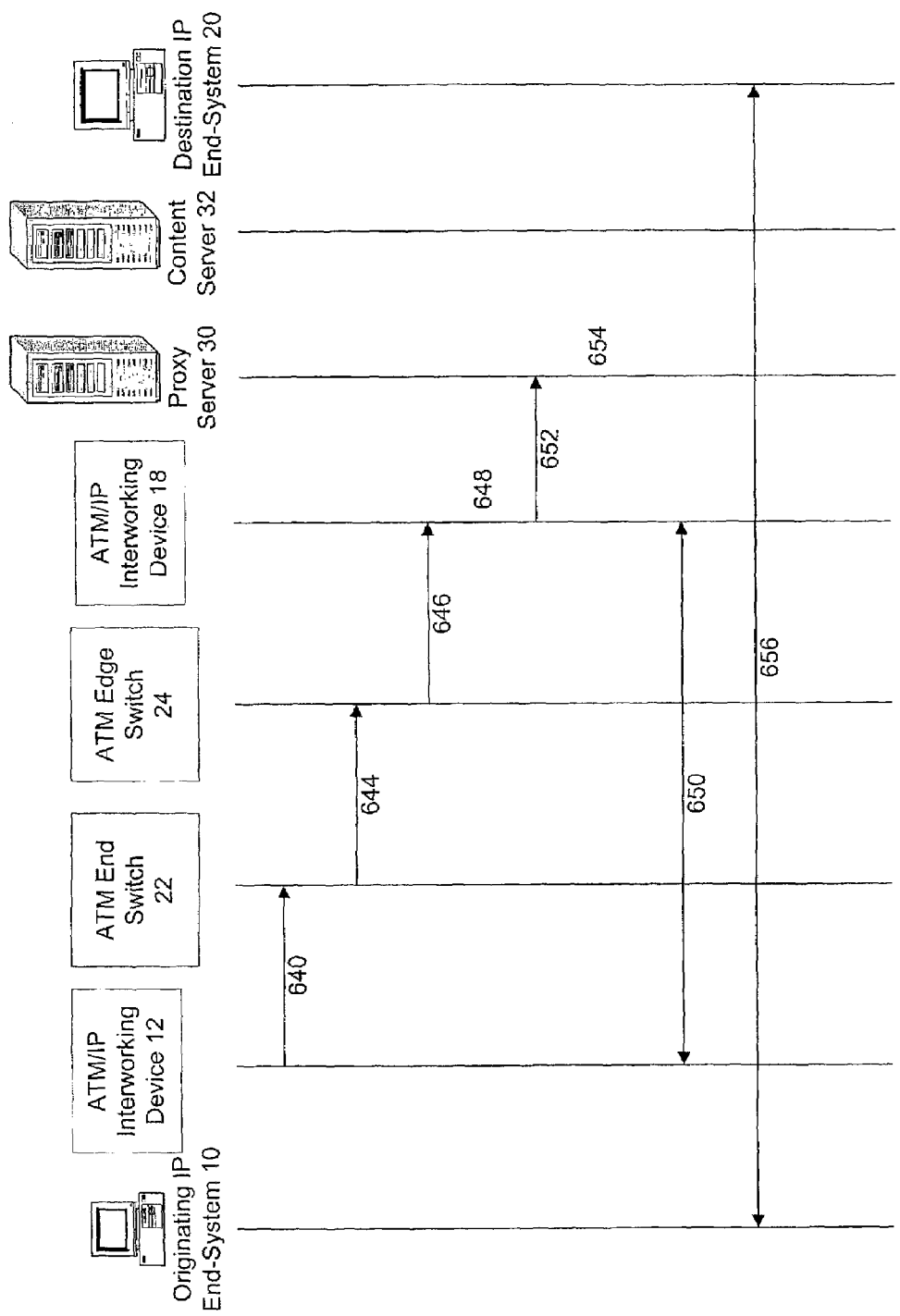
FIG. 6 is a flow diagram illustrating an RSVP RESV procedure corresponding to the RSVP PATH procedure of FIG. 5, according to an alternative embodiment of the present invention.

Because this is a reverse charging PATH request involving the proxy server 30, the IWF device 12 generates and sends an RSVP RESV message at step 640 of FIG. 6, without forwarding the PATH message to the originating end-system 10. Like the PATH message, the RESV message may contain the RSVP_CYSPEC object and the RSVP_SVCSPEC object. In particular, in order to establish the ATM SVC, the IWF device 12 launches an UNI SETUP message to the longest short-cut bridging device address indicated by the previously cached ATM RSVP_THOP object, which is the ATM address of the IWF device 18 in the present example. The UU IE of the UNI SETUP message contains the RSVP RESV message to be sent across the ATM network 8 to the IWF device 18.

The IWF device 18 sends the SETUP message, along with the RESV message, to the ATM edge switch 22 at step 640. The ATM edge switch 22 confirms receipt of the SETUP message and forwards the message to the ATM edge switch 24 at step 644. The message may also pass through intervening ATM core switches in the ATM network 8 (not pictured). The ATM edge switch 24 forwards the SETUP message to the IWF device 18 at step 646, which validates the UNI SETUP and the RESV messages with the cached PATH message at step 648. Also, to confirm the connection across the ATM network 8, the IWF device 18 and the ATM edge switches 22 and 24 exchange CONN and CONN ACK messages (not pictured) to complete the confirmation cycle, as discussed above with respect to FIG. 3.

After the IWF device 18 validates the UNI SETUP message and the RSVP RESV message, an ATM SVC at the requested QoS is set up between the originating IWF device 12 and the destination IWF device 18 through broadband access lines, as indicated by step 650. The IWF device 18 accordingly creates an entry in its forwarding table indicating the successful set up of the ATM SVC, an example of which is shown in Table 5.

TABLE 5

| Destination IP | Source IP | Port | Forward to Interface |
|---|---|---|---|
| Any local or private address | * | * | LAN |
| destination end-system 20 | originating end-system 10 | TCP/UDP port | WAN—new QoS SVC |
| * | * | * | WAN—default ATM connection |

As discussed above with respect to Table 1, the first three columns of Table 5 indicate the incoming interface of the IWF device 18 and the last column indicates the outgoing interface of the IWF device 18. Therefore, as indicated by the first row, when the destination IP data received at the IWF device 18 indicates any local or private IP address, the IWF device 18 directs the associated connection through the LAN interface. The asterisks in the first row indicate that the source IP address and port information do not affect the forward to interface when the destination IP data indicates a local or private IP address.

As indicated by the second row of Table 5, when data is received at the TCP/UDP port and provides that the destination IP address is the destination end-system 20 and the source IP address is the originating end-system 10, the IWF device 18 directs the connection to the new short-cut SVC through the WAN interface, identified by an associated VPI and VCI. As indicated by the asterisks in the third row of Table 5, incoming data directed to a port other than the TCP/UDP port, or indicating destination and source IP addresses other than the destination end-system 20 and the originating end-system 20, respectively, invokes the default ATM connection of the WAN interface.

Similarly, the IWF device 12 creates an entry in its forwarding table indicating the successful set up of the ATM SVC, an example of which is shown in Table 6.

TABLE 6

| Destination IP | Source IP | Port | Forward to Interface |
|---|---|---|---|
| Any local or private address | * | * | LAN |
| originating end-system 10 | destination end-system 20 | TCP/UDP port | WAN—new QoS SVC |
| * | * | * | WAN—default ATM connection |

The IWF device 18 also forwards the RESV message to the proxy server 30 at step 652. The proxy server accepts the RESV message on behalf of the destination end-system 20 at step 654. A short-cut IP connection at the requested QoS is then available over the newly established SVC between the IWF device 12 and the IWF device 18, enabling communication between the originating end-system 10 and the destination end-system 20, indicated at step 656. After the short-cut is established and available at step 656, the QoS IP session is moved from the IP network 6 to the new SVC based QoS short-cut in the ATM network. In other words, as in the embodiment involving an RSVP capable destination end-system 20, the IP traffic travels the dedicated QoS short-cut path between the originating end-system 10 and the destination end-system 20 through the ATM switches 22 and 24, as opposed to the hop-by-hop default IP path through the IP routers 14 and 16.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., TCP/IP, UDP/IP, RSVP, MPLS) and public telephone networks (ATM, DSL) represent examples of the state of the art. Such standards are periodically superseded by faster or more efficient equivalents having essentially the same functions. Accordingly, replacement standards and protocols having the same functions are considered equivalents.

What is claimed:

1. A method for establishing an Internet protocol (IP) connection through a switched transport network, between an originating host device and a destination host device communicating through an IP network, the destination host device being incapable of resource reservation protocol (RSVP) signaling, the method comprising:
    associating a switched transport network address of a destination bridging device with an IP address of the destination bridging device, without communicating with an address server, in response to an RSVP path message initiated by an RSVP capable proxy device in association with the destination host device, the RSVP path message being directed to the originating host device through the IP network; and
    establishing the IP connection, through the switched transport network and the destination bridging device, in response to a setup message directed to the switched transport network address of the destination bridging device.

2. The method for establishing the IP connection according to claim 1, the RSVP path message containing at least one quality of service parameter, which is passed to the setup message, wherein the IP connection is established in accordance with the at least one quality of service parameter.

3. The method for establishing the IP connection according to claim 1, the switched transport network comprising an asynchronous transfer mode (ATM) network.

4. The method for establishing the IP connection according to claim 3, each IP connection comprising a switched virtual circuit connection.

5. The method for establishing the IP connection according to claim 1, the switched transport network comprising a multi-protocol label switching (MPLS) network.

6. The method for establishing the IP connection according to claim 1, the setup message comprising a user-to-network interface protocol message.

7. A method for implementing an Internet protocol (IP) connection, through a switched transport network, between an originating host device and a destination host device, connected through an IP network, the destination host device being incapable of resource reservation protocol (RSVP) signaling, the method comprising:
    communicating a request for the IP connection to an RSVP capable proxy signaling device associated with the destination host device;
    inserting a switched transport network address of a destination bridging device into a first data field of an RSVP path message received from the proxy signaling device;
    forwarding the path message to an originating bridging device, through at least one router in the IP network by default routing, the at least one router passing the path message without modifying the first data field;
    forwarding a setup message to the destination bridging device, through at least one switching device in the switched transport network, based on the destination bridging device address retrieved from the first data field, the setup message including an RSVP reservation request message generated in response to the path message; and
    establishing the IP connection between the originating host device and the proxy signaling device, through the originating bridging device and the destination bridging device in response to the setup message, the proxy signaling device interfacing with the destination host device.

8. The method for implementing the IP connection according to claim 7, further comprising:
    including at least one quality of service connection parameter in a second data field of the path message received from the proxy signaling device;
    including the second data field in the responsive reservation request message; and
    establishing the IP connection in accordance with the at least one quality of service connection parameter.

9. The method for implementing the IP connection according to claim 8, the at least one quality of service connection parameter comprising a bandwidth.

10. The method for implementing the IP connection according to claim 7, further comprising:
    capturing the path message at the originating bridging device and storing the address of the first bridging device from the RSVP extension object in association with an address of the destination host device, provided by the proxy signaling device;
    retrieving the stored address of the destination bridging device based on the address of the destination host device included in the responsive reservation request message; and
    forwarding the setup message to the destination bridging device based on the retrieved address.

11. The method for implementing the IP connection according to claim 7, the switched transport network comprising an asynchronous transfer mode (ATM) network.

12. The method for implementing the IP connection according to claim 11, the short-cut connection comprising a switched virtual circuit.

13. The method for implementing the IP connection according to claim 7, the switched transport network comprising a multi-protocol label switching (MPLS) network.

14. A method for providing a guaranteed quality of service Internet protocol (IP) session, through an asynchronous transfer mode (ATM) network, between an originating end-system and a destination end-system that is incapable of resource reservation protocol (RSVP) signaling, the destination end-system interfacing with an RSVP capable proxy device, the method comprising:

establishing an initial IP session between the originating end-system and the destination end-system through an IP network;

receiving an RSVP path message from the proxy device, on behalf of the destination end-system, at a destination interworking function (IWF) device, the path message including at least one parameter defining the quality of service;

inserting an ATM address of the destination IWF device into a transport network hop (THOP) extension object of the path message;

forwarding the path message through the IP network by default routing to an originating IWF device without modifying the THOP extension object;

caching the THOP extension object in association with an IP address of the destination end-system;

launching a setup message through the ATM network based on the associated THOP extension object and the IP address of the destination end-system, the setup message including a responsive RSVP reservation request message, containing the at least one parameter defining the quality of service;

receiving the setup message at the destination IWF device and establishing a switched virtual circuit (SVC) connection between the destination IWF device and the originating IWF device in accordance with the at least one quality of service parameter;

forwarding the reservation request message to the proxy signaling device, which accepts the reservation request message on behalf of the destination end-system; and shifting the initial IP session between the originating end-system and the destination end-system to the SVC connection.

15. The method for providing the guaranteed quality of service Internet session, according to claim 14, in which the default routing comprises best effort routing among IP routers.

16. A system for establishing an Internet protocol (IP) connection between an originating host device and a destination host device through a switched transport network, the destination host device being incapable of resource reservation protocol (RSVP) signaling, the system comprising:

an RSVP capable proxy device that interfaces with the destination host device to provide RSVP signaling; and an originating bridging device that associates a switched transport network address and an IP address of a destination bridging device, without communicating with an address server, in response to an RSVP path message, initiated by the proxy device and received by the originating host device through an IP network, the originating bridging device responding with a setup message directed through the switched transport network to the switched transport network address of the destination bridging device;

wherein the IP connection is established, through the switched transport network and the proxy device, in response to the setup message.

17. The system for establishing the IP connection according to claim 16, the setup message including at least one predetermined bidirectional flow parameter received from the path message, wherein the IP connection is established in accordance with the at least one bidirectional flow parameter.

18. The system for establishing the IP connection according to claim 16, the switched transport network comprising one of an asynchronous transport mode (ATM) network and a multi-protocol label switching (MPLS) network.

19. A system for establishing an Internet protocol (IP) connection between an originating end-system and a destination end-system through a switched transport network, the destination end-system being incapable of resource reservation protocol (RSVP) signaling, the system comprising:

a proxy signaling device that interfaces with the destination end-system;

a first interworking function (IWF) device that inserts its switched transport network address into a first data field of an RSVP path message, received from the proxy signaling device, and forwards the path message through at least one router in an IP network by default routing, the at least one router passing the path message without modifying the first data field; and a second IWF device that receives the path message and forwards a setup message to the first IWF device through at least one switching device in the switched transport network, based on the first IWF device's address retrieved from the first data field of the path message, the setup message including an RSVP reservation request message generated in response to the path message;

wherein the IP connection is established between the originating end-system and the destination end-system, through the first bridging device, the second bridging device and the proxy signaling device, in response to the setup message.

20. The system for establishing the IP connection according to claim 19, wherein at least one quality of service connection parameter is included in a second data field of the path message and passed to the reservation request message included in the setup massage; and wherein the IP connection is established in accordance with the at least one quality of service connection parameter.

21. The system for establishing the IP connection according to claim 20, the at least one quality of service connection parameter comprising a bandwidth.

22. A system for providing a guaranteed quality of service Internet protocol (IP) session, through an asynchronous transfer mode (ATM) network, between an originating end-system and a destination end-system that is incapable of resource reservation protocol (RSVP), signaling, the originating end-system and the destination end-system having an initial IP connection, the system comprising:

a proxy signaling device that interfaces with the destination end-system and launches an RSVP path message, including at least one parameter defining a predetermined quality of service and a transport network hop (THOP) extension object;

a first interworking function (IWF) device that inserts its ATM address into the THOP extension object of the path message, received from the proxy signaling device, and forwards the path message through at least one router in an IP network by default routing, the at least one router passing the path message without modifying the THOP extension object; and a second IWF device that receives the path message and launches a setup message to the first IWF device through at least one switch in the ATM network, based on the ATM address in the THOP extension object, the setup message including a responsive RSVP reservation request message, including the at least one parameter defining the quality of service;

wherein a switched virtual circuit (SVC) connection is established between the first IWF device and the second IWF device in accordance with the at least one quality of service parameter, in response to the setup message; and wherein the reservation request message is forwarded to the proxy signaling device, which accepts the reservation request message on behalf of the destination end-system, so that the initial IP session between the originating end-system and the destination end-system is implemented over the SVC connection.

23. A tangible computer readable medium that stores a computer program, executable by a computer, for enabling an Internet protocol (IP) connection across a switched transport network between an originating host device and a destination host device, through a first bridging device and a second bridging device, the destination host device being incapable of resource reservation protocol (RSVP) signaling, the computer readable medium comprising:

a first path message code for receiving a first path message signal from a proxy signaling device connected to the destination host device, the first path message signal including an address parameter for the second bridging device and an IP address of the proxy signaling device;

a second path message code for forwarding a second path message signal through an IP network without modification to the address parameter, the second path message signal including a switched transport network address of the second bridging device in the address parameter and the IP address of the proxy signaling device;

a reservation request message code for receiving a second path message signal by the first bridging device in response to the second path message, the reservation request message signal including the IP address of the proxy signaling device;

a first setup message code for forwarding a first setup message signal through the switched transport network to the transport network address of the second bridging device, retrieved from the second path message signal, the first setup message signal including the reservation request message signal; and a second setup message code for forwarding a second setup message signal to the IP address of the proxy signaling device, the second setup message signal including the reservation request message signal, the IP connection being established in response to the second setup message signal.

24. The tangible computer readable medium according to claim 23, the first path message signal, the second path message signal and the reservation request message signal further including a bidirectional flow parameter that defines at least one predetermined quality of service attribute of the IP connection, wherein the IP connection is established in accordance with the quality of service attribute.

25. The tangible computer readable medium according to claim 24, wherein the at least one quality of service attribute comprises a bandwidth.

26. The tangible computer readable medium according to claim 23, the first path message signal, the second path message signal and the reservation request message signal further including a reverse charging parameter, wherein accounting data for the IP connection is associated with the originating host device when the reverse charging parameter is activated.

27. The tangible computer readable medium according to claim 26, wherein the accounting data for the IP connection is associated with the destination host device when the reverse charging parameter is not activated.

28. The tangible computer readable medium according to claim 23, the first path message signal, the second path message signal and the reservation request message signal complying with a resource reservation protocol (RSVP).

29. The tangible computer readable medium according to claim 23, the first setup message signal and the second setup message signal complying with a user-to-network interface (UNI) protocol.

30. The tangible computer readable medium according to claim 28, the switched data transport network comprising an asynchronous transport mode (ATM) network.

31. The tangible computer readable medium according to claim 28, the switched data transport network comprising a multi-protocol label switching (MPLS) network.

* * * * *

UNITED STATES PATENT AND TRADEMARK OFFICE
CERTIFICATE OF CORRECTION

PATENT NO. : 7,272,145 B2  Page 1 of 1
APPLICATION NO. : 10/207906
DATED : September 18, 2007
INVENTOR(S) : Weijing Chen et al.

It is certified that error appears in the above-identified patent and that said Letters Patent is hereby corrected as shown below:

At column 24, line 50 (claim 22), should read: (RSVP)

Signed and Sealed this

Third Day of August, 2010

David J. Kappos
*Director of the United States Patent and Trademark Office*